United States Patent [19]

Baird et al.

[11] Patent Number: 4,753,160

[45] Date of Patent: Jun. 28, 1988

[54] MOLD PRESS FORCE EQUALIZER

[75] Inventors: John Baird, Scottsdale; William J. Miller, Tempe, both of Ariz.

[73] Assignee: Motorola Inc., Schaumburg, Ill.

[21] Appl. No.: 123,414

[22] Filed: Nov. 20, 1987

[51] Int. Cl.$^4$ .................. D30B 11/02; D30B 15/06; D30B 15/28

[52] U.S. Cl. .................. 100/93 P; 100/218; 100/295; 425/406

[58] Field of Search ............... 156/583.1; 72/63, 296, 72/382; 100/93 P, 295, 218, 915, 918; 425/406, 407

[56] References Cited

U.S. PATENT DOCUMENTS

| | | | |
|---|---|---|---|
| 4,573,335 | 3/1986 | Persson | 72/63 |
| 4,576,092 | 3/1986 | Yamato | 100/93 P |
| 4,612,081 | 9/1986 | Kasper et al. | 425/407 |

FOREIGN PATENT DOCUMENTS 1444093 7/1976 United Kingdom.

Primary Examiner—Andrew M. Falik
Attorney, Agent, or Firm—Raymond J. Warren

[57] ABSTRACT

A mold press comprising a force equalizer independent of the mold platens. The force equalizer consists of a pair of plates defining a cavity therebetween. The cavity is filled with a force distributing material, such as hydraulic fluid. An opening is provided through the force equalizer to provide the extruder access to the mold plates. This opening is surrounded by a floating seal which permits movement of the equalizer plates with respect to the seal. The cavity is designed to extend beyond the chase footprint areas by an amount dictated by the size and relation of the footprint areas to one another.

11 Claims, 3 Drawing Sheets

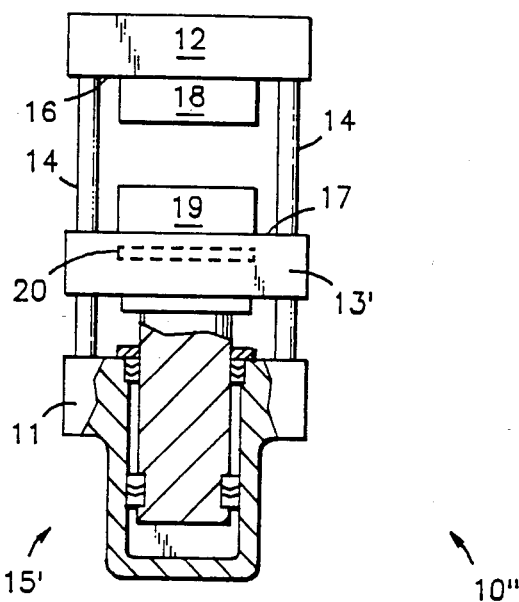
FIG. 3
—PRIOR ART—
FIG. 4
—PRIOR ART—
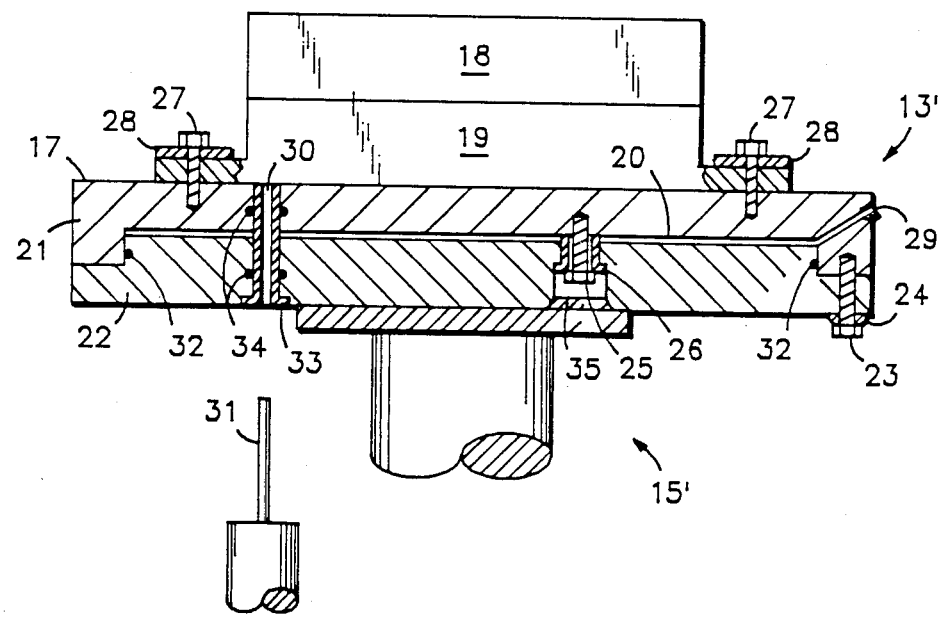

MOLD PRESS FORCE EQUALIZER

BACKGROUND OF THE INVENTION

The present invention relates, in general, to mold presses and, in particular, to a mold press force equalizer.

There are many forms of mold presses known in the art, such as those described in U.S. Pat. No. 4,576,092 assigned to Kohtaki & Co., Ltd. A mold press consists primarily of fixed and movable platens, upper and lower mold plates, a pressing/driving means, and an extruder. When the pressing/driving means exerts a force on the movable platen, the mold plates are forced together between the movable and fixed platens. An extruder then extends into one of the molds and forces plastic, or the like, under pressure into the mold cavities to encapsulate semiconductor devices, or the like.

The '092 patent describes a "Uniform-Pressure Press Apparatus" having a fluid filled cavity in one, or both, of the platens. This is used to distribute the pressure evenly across the load. This even distribution is a key in limiting, and eliminating, flash caused when some of the extruded material escapes between the mold plates. A major drawback of the device described in the '092 patent is its inflexibility. The area of the fluid filled cavity will dictate the size and dimension of the mold cavities and runners. This would limit the effective use of the apparatus.

In addition, mechanical and maintenance problems can result from having the force equalizer located within the platens of the press.

Accordingly, it is an objective of the present invention to provide a mold press force equalizer that overcomes the above deficiencies.

A further object of the present invention is to provide a mold press force equalizer which is not a portion of the mold platens.

Another object of the present invention is to provide a mold press force equalizer which allows independent design of the mold plates.

Still another object of the present invention is to provide a mold press force equalizer which may be used in existing mold presses.

The above and other objects and advantages of the present invention are provided by the mold press force equalizer described herein.

SUMMARY OF THE INVENTION

A particular embodiment of the present invention consists of a mold press force equalizer independent of the mold platens. The force equalizer consists of an upper plate and a lower plate defining a cavity therein. The cavity is filled with either fluid or some other force distributing material, such as rubber. The size of the force equalizer is determined by the size and design of the mold plates. An opening through the force equalizer is provided for the extruder. A floating clamp is utilized about the opening to maintain the constant pressure across the force equalizer.

BRIEF DESCRIPTION OF THE DRAWINGS

FIG. 3 is a simplified side view, with portions broken away, of a prior art mold press containing a force equalizer;

FIG. 4 is a cross sectional view of the force equalizer of FIG. 3;

DETAILED DESCRIPTION OF THE INVENTION

Figure 1:
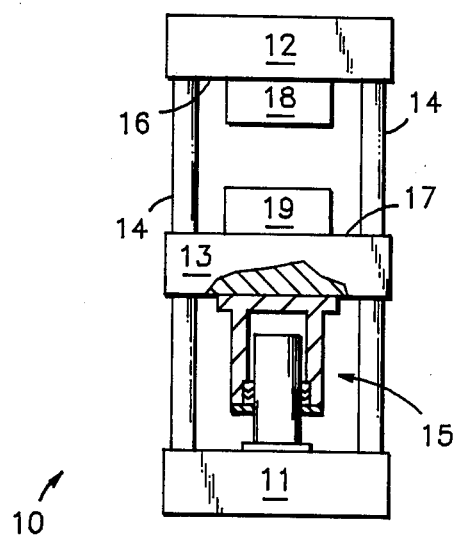
FIGS. 1 and 2 are simplified side views, with portions broken away, of prior art mold presses.
Figure 2:
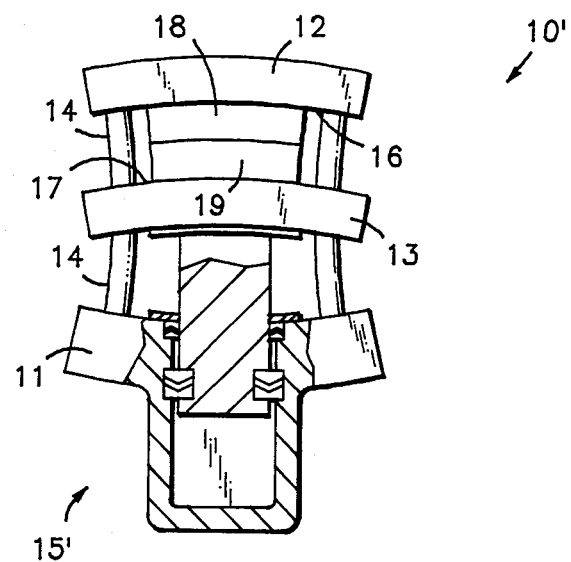

Referring first to FIGS. 1 and 2, simplified side views, with portions broken away, of prior art mold presses, generally designated 10, are illustrated. FIG. 1 shows press 10 in its open, or resting, state. Press 10 consists of a base 11, a fixed platen 12, and a movable platen 13. Base 10 is coupled to a plurality of tie rods 14 which support fixed platen 12. Movable platen 13 is slideably disposed about tie rods 14. An hydraulic press 15 is shown disposed between base 11 and movable platen 13. Mounted on facing surfaces 16 and 17 of platens 12 and 13, respectively, are top and bottom mold plates 18 and 19, respectively.

As illustrated in FIG. 2, a press 10' is shown with a hydraulic press 15'. Hydraulic press 15' is operated in a manner reverse to hydraulic press 15 of press 10. However, the same results are achieved by either press 10 or 10'.

As hydraulic press 15 is activated, movable platen 13 is extended toward fixed platen 12. Once mold plates 18 and 19 contact, further pressure will cause deformation of press 10. This deformation is illustrated in an exaggerated manner on press 10'. The deformation in press 10' is caused by the unequal distribution of pressure across surfaces 16 and 17, with the greater pressure being exerted in the center. While this pressure is needed to create a tight fit between plates 18 and 19, the deformation resulting from the pressure can cause mismatch where flash may occur.

One prior art method of solving this problem is illustrated in the '092 patent shown presently in FIG. 3. Here a press 10" is illustrated having essentially the same parts as FIG. 2 with the exception of movable platen 13'. Platen 13' has been designed to contain a pressure equalizing chamber 20.

Platen 13' is shown in more detail in FIG. 4. Platen 13' is comprised of an operating table 21 and a body portion 22. Table 21 and body 22 are coupled using a bolt 23 and spring 24. Bolt 23 passes freely through body 22 and is threaded into table 21. This enables table 21 to move independently of body 22 while spring 24 maintains the tension. A seal 32 is provided between table 21 and body 22 to allow movement without leakage of fluid from chamber 20.

A second bore hole through body 21 is provided for a second bolt 25. A ring collar 26 is disposed about bolt 25. Bolt 25 is utilized to transmit a parting force from body 22 to table 21 when hydraulic press 15' is retracted. This assists in separating plates 18 and 19 since plate 19 is secured to upper surface 17 of table 21 by bolts 27 and washers 28. A plug 35 is used to prevent leakage of fluid from platen 13'.

In addition, platen 13' is illustrated having openings 29 and 30. Opening 29 is provided as an oil inlet for filling chamber 20. Opening 30 is a through hole provided for receiving an ejection rod 31. Disposed in opening 30 is a pipe 33 and a pair of seals 34. This allows movement of table 21 and body 22 relative to pipe 33 without leakage of fluid from chamber 20.

As illustrated, a force will be exerted on body 22 by hydraulic press 15'. This force will be greater at the center of body 22 than at the edges. The total force exerted on body 22 will be transmitted to the fluid in chamber 20. This fluid will distribute the pressure evenly throughout chamber 20 thereby transmitting an evenly distributed pressure to table 21. Table 21 will in turn transmit an unevenly distributed pressure to plate 19. The pressure to plates 18 and 19 will not be even because the area of plate 21 is outside plate 19.

While the pressure is evenly distributed through chamber 20, the even distribution falls off at the edges where there is no opposing plate. This will limit the size and shape of the mold to that dictated by the size, shape, and location of chamber 20.

In addition, this does not provide any assistance in equalizing pressure in existing mold presses of differing designs.

The present invention is designed to be separate from the mold platens. This enables independent design of mold plates to achieve the most efficient use of space; and allows for use in existing mold presses.

Figure 5:
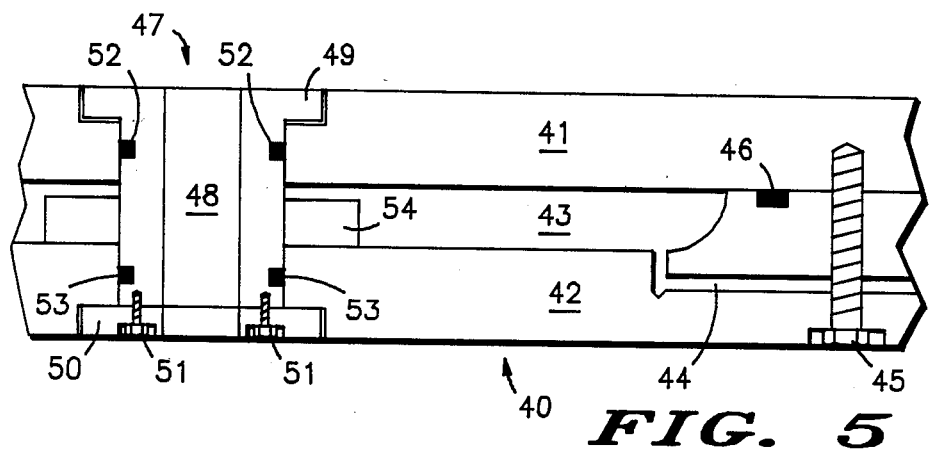
FIG. 5 is a cross sectional view of a force equalizer embodying the present invention.

Referring now to FIG. 5, a cross sectional view of a force equalizer, generally designated 40, embodying the present invention is illustrated. Equalizer 40 consists basically of a top plate 41 and a bottom plate 42 coupled to form a chamber or cavity 43. Chamber 43 is filled with a fluid, such as an hydraulic fluid or the like, through an opening 44. Plates 41 and 42 are coupled together using a plurality of bolts, such as bolt 45. Around the periphery is a seal 46 that prevents fluid in chamber 43 from escaping.

At the center of equalizer 40 is an opening 47. Since equalizer 40 is designed for use above or below the mold plates, opening 47 is provided to allow access of the mold extruder to the mold plates. Disposed about opening 47 is a collar 48 having a lip 49 that contacts top plate 41. Coupled to collar 48, opposite lip 49, is a cap 50. Cap 50 is bolted to collar 48 with bolts 51. Two seals, 52 and 53, are disposed about collar 48 such that seal 52 contacts top plate 41; and, seal 53 contacts bottom plate 42. This allows plates 41 and 42 to move with respect to collar 48 while a fluid seal is maintained.

A spacer 54 is also disposed about collar 48 between top plate 41 and bottom plate 42. This prevents top plate 41 (bottom plate 42) from moving to the extent that seal 52 (seal 53) loses contact with top plate 41 (bottom plate 42).

Figure 6:
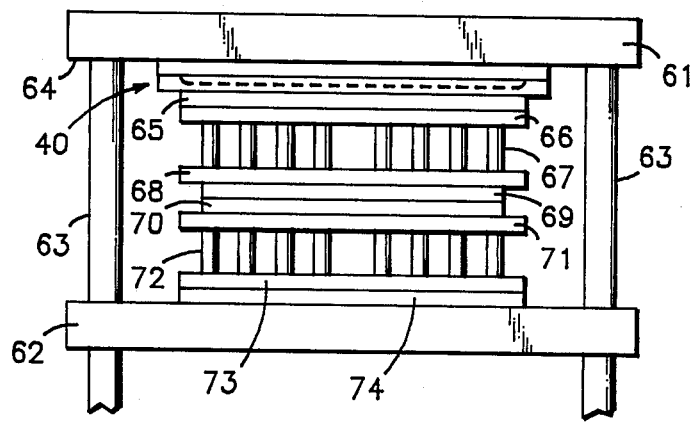
FIG. 6 is a side view of a mold press embodying the present invention.

Force equalizer 40 is shown in operation in FIG. 6. A portion of a press, generally designated 60, is illustrated having a fixed platen 61 and a movable platen 62. Fixed platen 61 is supported by a plurality of pillars 63 which also serve as guides for movable platen 62. Force equalizer 40 is disposed adjacent a surface 64 of fixed platen 61.

Below equalizer 40 is an insulator 65. Insulator 65 is provided to protect equalizer 40 and fixed platen 61 from the heat when mold 60 is heated. Below insulator 65 is an insulator backup plate 66. Since insulator 65 is often composed of a glass type structure, backup 66 is provided to prevent damage to insulator 65.

Below backup 66 is a plurality of pillars 67. Pillars 67 are spaced to focus the force being exerted over the mold to the chase footprint areas. This will be discussed in more detail below in conjunction with FIG. 7. Below pillars 67 is a first mold base 68 and upper and lower mold plates 69 and 70. Below mold plate 70 is a second mold base 71, a second set of pillars 72, a second insulating backup plate 73, and a second insulator 74.

Figure 7:
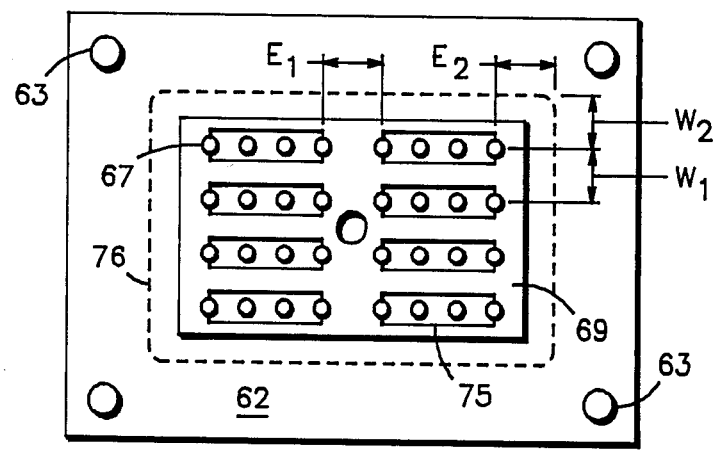
FIG. 7 is a top view of a mold plate with various features of a mold press embodying the present invention superimposed thereon.

Referring now to FIG. 7, mold platen 62 is illustrated with various features of mold press 60 superimposed. Platen 62 is shown having mold plate 69 disposed thereon. Hatched areas 75 represent chase footprint areas within plate 69. Pillars 67 are shown disposed above chase footprint areas 75. Dashed line 76 represents the seal of the pressure equalizing chamber.

Chase footprint areas 75 are the areas sought to be placed under uniform pressure. The areas outside footprints 75 are not as important since there is no plastic in these areas. Pillars 67 are placed such that the force exerted on plate 69 is focused on footprint areas 75.

In order to exert a uniform force across chase areas 75, a force equalizer is utilized. The force equalizer is defined by outside dimensions dictated by the size of areas 75 and the location of pillars 67. As shown in FIG. 7, the distance between the centers of chases 75 is represented by $W_1$ and the distance between chases 75 at the center of plate 69 is represented by $E_1$. The distance between the center of chases 75 and the edge of dashed line 76 parallel to area 75 is designated by $W_2$. The distance between the end of chases 75 and the edge of dashed line 76 perpendicular to area 75 is designated by $E_2$. In order to maintain a constant pressure, it is necessary for $W_2$ ($E_2$) to be greater than, or equal to, $W_1$ ($E_1$). Therefor, the design of chase footprint areas 75 dictates the minimum size and the location of equalizer 40.

The distances $W_2$ and $E_2$ are required for the pressure being exerted to reach an equal distribution for each specific shape and distribution of chase areas 75. Around the edges of force equalizer 40, where plates 41 and 42 are fastened by bolts 45, the pressure will be affected by bolts 45. The distances $W_2$ and $E_2$ allow chase footprint areas 75 to be covered by a portion of equalizer 40 therby compensating for the edge fastening by the bolts 45. This results in the pressure being evenly distributed over chase areas 75.

Equalizer 40 has been illustrated above as having a cavity filled with a hydraulic fluid. It should be noted that any type of material, such as rubber, or fluids may be disposed in cavity 43 which will evenly distribute the pressure.

Thus, after reviewing the above specification, it will be apparent to one skilled in the art that there has been provided in accordance with the invention, a device and method that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A mold, press comprising:
   a base;
   a fixed platen;
   a plurality of supporting members coupled to said base and said fixed platen;
   a movable platen slideably disposed about said supporting members between said base and said fixed platen;
   a first insulator disposed on said movable platen;

a first insulator backup plate disposed on said first insulator;

a first plurality of pillars disposed on said first insulator backup plate;

a first mold base disposed on said first plurality of pillars;

a lower mold plate disposed on said first mold base;

an upper mold plate disposed on said lower mold plate;

a second mold base disposed on said upper mold plate;

a second plurality of pillars disposed on said second mold base;

a second insulator backup plate disposed on said second plurality of pillars;

a second insulator disposed on said second insulator backup plate;

a force equalizer disposed between said second insulator and said fixed platen; and force means for exerting a force on said movable platen, said force means being disposed between said base and said movable platen.

2. The mold press of claim 1 wherein said force equalizer comprises:

an upper plate having a first surface adjacent said fixed platen, a second surface, and defining an opening central thereto extending from said first surface to said second surface;

a lower plate having a first surface adjacent said second surface of said upper plate forming a cavity therebetween, a second surface adjacent said second insulator, and defining an opening central thereto extending from said first surface to said second surface;

first sealing means for preventing leakage of a fluid from said cavity defined by said upper and lower plates, said first sealing means being disposed between said upper and lower plates a collar slideably disposed in the openings central to said upper and lower plates;

second sealing means for preventing leakage of a fluid from said cavity defined by said upper and lower plates, said second sealing means being disposed about said collar adjacent said upper plate; and third sealing means for preventing leakage of a fluid from said cavity defined by said upper and lower plates, said third sealing means being disposed about said collar adjacent said lower plate.

3. The mold press force equalizer of claim 2 further comprising a spacer disposed about said collar between said upper and lower plates.

4. The mold press force equalizer of claim 2 wherein the cavity defined by said second surface of said upper plate and said first surface of said lower plate is filled with an hydraulic fluid.

5. The mold press force equalizer of claim 2 wherein one of said upper and lower plates defines a fluid inlet extending from said cavity to an exterior portion of said plate.

6. The mold press force equalizer of claim 2 wherein the cavity defined by said second surface of said upper plate and said first surface of said lower plate is filled with a rubber.

7. A mold press comprising:
a base;
a fixed platen;

a plurality of supporting members coupled to said base and said fixed platen;

a movable platen slideably disposed about said supporting members between said base and said fixed platen;

a first insulator disposed on said movable platen;

a first insulator backup plate disposed on said first insulator;

a first plurality of pillars disposed on said first insulator backup plate;

a first mold base disposed on said first plurality of pillars;

a lower mold plate disposed on said first mold base;

an upper mold plate disposed on said lower mold plate;

a second mold base disposed on said upper mold plate;

a second plurality of pillars disposed on said second mold base;

a second insulator backup plate disposed on said second plurality of pillars;

a second insulator disposed on said second insulator backup plate;

an upper force equalizing plate having a first surface adjacent said fixed platen, a second surface, and defining an opening central thereto extending from said first surface to said second surface;

a lower force equalizing plate having a first surface adjacent said second surface of said upper force equalizing plate forming a cavity therebetween, a second surface adjacent said second insulator, and defining an opening central thereto extending from said first surface to said second surface;

first sealing means for preventing leakage of a fluid from said cavity defined by said upper and lower force equalizing plates, said first sealing means being disposed between said upper and lower force equalizing plates a collar slideably disposed in the openings central to said upper and lower force equalizing plates;

second sealing means for preventing leakage of a fluid from said cavity defined by said upper and lower force equalizing plates, said second sealing means being disposed about said collar adjacent said upper force equalizing plate; and third sealing means for preventing leakage of a fluid from said cavity defined by said upper and lower force equalizing plates, said third sealing means being disposed about said collar adjacent said lower force equalizing plate; and force means for exerting a force on said movable platen, said force means being disposed between said base and said movable platen.

8. The mold press of claim 7 further comprising a spacer disposed about said collar between said upper and lower force equalizing plates.

9. The mold press of claim 7 wherein the cavity defined by said second surface of said upper force equalizing plate and said first surface of said lower force equalizing plate is filled with an hydraulic fluid.

10. The mold press of claim 7 wherein one of said upper and lower force equalizing plates defines a fluid inlet extending from said cavity to an exterior portion of said force equalizing plate.

11. The mold press of claim 7 wherein the cavity defined by said second surface of said upper force equalizing plate and said first surface of said lower force equalizing plate is filled with a rubber.

* * * * *